US006637207B2

(12) United States Patent
Konezciny et al.

(10) Patent No.: US 6,637,207 B2
(45) Date of Patent: Oct. 28, 2003

(54) GAS-STORAGE POWER PLANT

(75) Inventors: Stephan Konezciny, Wettingen (CH); Franz Suter, Gebenstorf (CH)

(73) Assignee: Alstom (Switzerland) Ltd, Baden (CH)

( * ) Notice: Subject to any disclaimer, the term of this patent is extended or adjusted under 35 U.S.C. 154(b) by 63 days.

(21) Appl. No.: 10/055,997

(22) Filed: Jan. 28, 2002

(65) Prior Publication Data
US 2003/0033809 A1 Feb. 20, 2003

Related U.S. Application Data
(60) Provisional application No. 60/312,783, filed on Aug. 17, 2001.

(51) Int. Cl.[7] .................................................. F02C 1/02
(52) U.S. Cl. ............................... 60/727; 137/613; 60/7; 60/787
(58) Field of Search ......................... 60/787, 727, 774; 137/613

(56) References Cited

U.S. PATENT DOCUMENTS 4,043,120 A * 8/1977 Hoffeins ...................... 60/787
5,845,479 A * 12/1998 Nakhamkin et al. ......... 60/777

OTHER PUBLICATIONS

Gehard J. Weiss, "Electronic OverspeedTurbine Protection without Real Overspeed Test Valve Test with Single Valve Arrangement", 2000 International Joint Power Generation Conference: Session 2: Design Operations & Maintenance of Advanced Turbines, Miami Beach; Jul. 23–26, 2000.

John Daly et al., "CAES—Reduced to Practice", ASME Turbo Expo 2001, Jun. 4–7, 2001, New Orleans, Louisiana.

* cited by examiner

Primary Examiner—Ehud Gartenberg
(74) Attorney, Agent, or Firm—Burns, Doane, Swecker & Mathis, L.L.P.

(57) ABSTRACT

The present invention relates to a gas-storage power plant, comprising
 a gas reservoir (8) in which a gas can be stored under pressure,
 a turbogroup (2) which has at least one turbine (3, 5),
 a gas-supply line (9) which leads from the gas reservoir (8) to the turbogroup (2), and
 a valve arrangement (12) which is arranged in the gas-supply line (9) and throttles a storage pressure ($P_S$) applied on the inlet side to a working pressure ($P_A$) by closed-loop and/or open-loop control.

In order to improve the reliability of the valve arrangement (12), it has at least two control valves (13, 14) arranged in series. A leading first control valve (13) throttles the storage pressure ($P_S$) applied on the inlet side to an intermediate pressure ($P_Z$) by closed-loop or open-loop control. A subsequent second control valve (14) throttles the pressure ($P_Z$) applied on the inlet side to the working pressure ($P_A$) by closed-loop control.

12 Claims, 2 Drawing Sheets

GAS-STORAGE POWER PLANT

This application claims priority under 35 U.S.C. §119 to U.S. Provisional Application Ser. No. 60/312,783 entitled COMPRESSED AIR ENERGY SYSTEM and filed on Aug. 17, 2001 the entire content of which is hereby incorporated by reference.

FIELD OF THE INVENTION

The invention relates to a gas-storage power plant having the features of the preamble of claim 1. The invention also relates to a method of throttling a storage pressure to a working pressure for a turbogroup of such a gas-storage power plant.

BACKGROUND OF THE INVENTION

Such a gas-storage power plant is normally interconnected in a "Compressed-Air-Energy-Storage System", in short a CAES system. The basic idea of a CAES system is seen in the fact that excess energy which is generated by permanently operated conventional power generating plants during the base-load times is transferred to the peak-load times by bringing gas-storage power plants onto load in order to thereby use up less resources overall for producing electrical energy. This is achieved by air or another gas being pumped under a relatively high pressure into a reservoir by means of the inexpensive excess energy, from which reservoir the air or gas can be extracted when required for generating relatively expensive current. This means that the energy is stored in a retrievable manner in the form of potential energy. Worked-out coal or salt mines, for example, serve as reservoirs. Since the gas stored in the gas reservoir is normally air, such a gasstorage power plant is generally also designated as an air-storage power plant.

Gas-storage power plants of this type are known, for example, from the report "CAES REDUCED TO PRACTICE" by John Daly, R. M. Loughlin from Dresser-Rand, Mario DeCorso, David Moen from Power Tech Associates Inc., and Lee Davis from Alabama Electric Cooperative Inc., which has been presented at the "ASME TURBO EXPO 2001". Accordingly, a gas-storage power plant normally comprises a gas reservoir, in which a gas can be stored under pressure, and a turbogroup which has at least one turbine. A gas-supply line connects the gas reservoir to the turbogroup, so that the turbine of the turbogroup can be driven with the gas from the gas reservoir. Arranged in the gas-supply line is a control valve arrangement which throttles a storage pressure applied on the inlet side to a working pressure required by the turbogroup. The control valve arrangement normally comprises a control valve, the throttling effect of which can be controlled in an open-loop and/or closed-loop system, and a stop valve which is connected upstream of the control valve and can be switched over between an open position for normal operation and an emergency-trip position.

In this case, the control valve must be actuated in such a way that the required working pressure is always provided on the outlet side. However, this working pressure is variable and depends on the current operating state, or on an operating state to be set, of the turbogroup. In addition, the storage pressure applied on the inlet side may also vary within a relatively large range, since the gas reservoir empties during operation of the turbogroup, a factor which is accompanied by a decrease in the storage pressure. For example, the storage pressure varies within a large range over the course of the operating week by virtue of the fact that the storage pressure is highest at the start of the week and, after daily decrease and partial refilling of the storage cavern at night during the working week, the storage pressure toward the end of the working week is finally at the lowest level. The storage pressure rises again to the level at the start of the week by filling the storage cavern during the weekend. Accordingly, the control range, for example, over the course of a week is very large and the outlay in terms of open-loop or closed-loop control at the control valve for the provision of the currently desired working pressure is relatively high. However, increased outlay in terms of closed-loop or open-loop control at the control valve may be at the expense of the reliability and thus of the operating safety of the control valve arrangement. Furthermore, in particular during start-up and during the loading of the turbogroup, very high pressure differences may be present between the storage pressure applied at the inlet side of the control valve and the working pressure to be provided on the outlet side, for example if the gas reservoir is still filled to the maximum level and the turbogroup only requires a minimum working pressure. Accordingly, the control valve must realize extremely pronounced throttling effects. In the process, vibrations and oscillation excitations, in particular in combination with noise emissions, may occur in the control valve, as a result of which the control valve is highly loaded. High loads may lead to material fatigue and to failure. A control valve which fails during start-up of the turbines may lead to damage or destruction of the turbines.

SUMMARY OF THE INVENTION

The invention is intended to provide a remedy here. The object of the present invention is to show a gas-storage power plant of the type mentioned at the beginning which ensures relatively high reliability and operating safety for the valve arrangement.

This problem is solved by the subject matter of the independent claims. Advantageous embodiments are the subject matter of the dependent claims.

The present invention is based on the general idea of designing the throttling of the storage pressure to the working pressure in at least two stages. This measure leads to considerably smaller pressure differences in the individual throttling stages. Accordingly, the loading on the throttling points is reduced. Furthermore, the invention provides considerable simplification of the closed-loop or open-loop control of the individual throttling points by the first throttling stage being controlled in a closed-loop or open-loop system according to the changes in the storage pressure, whereas the last throttling stage is controlled in a closed-loop system according to the changes in the working pressure or the intermediate pressure. Both the reduction in the outlay for the closed-loop or open-loop control of the throttling points and the reduction in the pressure difference occurring at the individual throttling points result in an increase in the reliability and the operating safety of the valve arrangement.

In a preferred embodiment of the invention, the valve arrangement has two throttling stages. There, the first throttling stage is designed as a first control valve, this control valve in particular having the function of an emergency-trip or stop valve and a control function.

The first throttling stage serves to reduce the storage pressure applied on the inlet side to an intermediate pressure. The result of this measure is that the aforesaid intermediate pressure is admitted on the inlet side to the second throttling point, a second control valve, as a result of which the throttling to the working pressure is considerably simplified.

The valve arrangement may of course have any desired number of throttling stages, by means of which throttling is effected to several intermediate pressures and, by the last stage, to the working pressure.

In a further preferred embodiment of the invention, the control valves each have an actuator, these actuators being connected to a control device which is interconnected in a feedback control circuit or a plurality of feedback control circuits. A feedback control circuit for the first control valve directs values of the storage pressure and/or of the intermediate pressure to the control device. A feedback control circuit for a further control valve or the last control valve directs values of the intermediate pressure and/or of operating variables of the turbogroup to the control device.

In a further embodiment, a control valve or a plurality of control valves are designed as relieved single-seat valves. All the control valves are preferably designed as relieved single-seat valves, which permits a cost reduction. A relieved single-seat valve has the advantage that it requires small actuating forces and thus small drives. Small drives also have short actuating times. (Such short actuating times ensure that the overspeed of the air turbine in the event of a blackout remains within the required limits.)

In a further embodiment, the valve arrangement has a bypass valve, which is required when the plant is started up. By means of the bypass valve, the flow bypasses the air turbine, and the requisite air is injected directly upstream of the combustion chamber. With the bypass-valve arrangement, an additional stop member can be saved. The first control or emergency-trip valve is regarded as a redundant valve for the air control valve of the air turbine and the bypass. In a method as claimed in claim 7 for throttling the storage pressure in such a gasstorage power plant, the first control valve of the valve arrangement is controlled in a closed-loop system in such a way that an essentially constant intermediate pressure is generated.

This method is to be used in particular when closed-loop control is to be effected according to the storage pressure varying over the course of the week. In a special method for this purpose, the intermediate pressure is controlled in a closed-loop system by a comparison between a predetermined setpoint and an actual value of the intermediate pressure and by determining the pressure deviation. This closed-loop control is realized by a simple feedback control circuit with the intermediate pressure as command variable.

In a corresponding manner, the second or last throttling stage of the valve arrangement can be actuated as a function of a setpoint/actual-value deviation from a command variable of the turbogroup. The working pressure then occurs according to this command variable. This closed-loop control is realized by a feedback control circuit of simple construction with a corresponding command variable of the turbogroup.

The intermediate pressure which can be set with the first throttling point is expediently selected in such a way that it is greater than or equal to the maximum working pressure. This ensures that the intermediate pressure, during operation of the turbogroup, can be kept essentially constant or within a certain range at all the storage pressures admissible for this and at all the working pressures admissible for this. As a result, the closed-loop and/or open-loop control of the throttling points is simplified at all the pressure differences which occur between storage pressure and working pressure.

In a further method as claimed in claim 9 for throttling the storage pressure of the gas-storage power plant according to the invention, the first control valve is controlled in an open-loop system according to a fixed or predetermined valve position, whereupon throttling is effected to an intermediate pressure which is variable in accordance with the varying storage pressure. The valve position is predetermined according to a storage pressure selected for a certain weekday. However, since the storage pressure can deviate from the selected day pressure, the generated intermediate pressure is correspondingly variable.

Further important features and advantages of the invention follow from the subclaims and/or from the figures and the description of the figures.

BRIEF DESCRIPTION OF THE DRAWINGS

Preferred exemplary embodiments of the invention are shown in the drawings and explained in more detail in the description below.

In the drawing, in each case schematically.

DETAILED DESCRIPTION OF THE INVENTION

Figure 1:
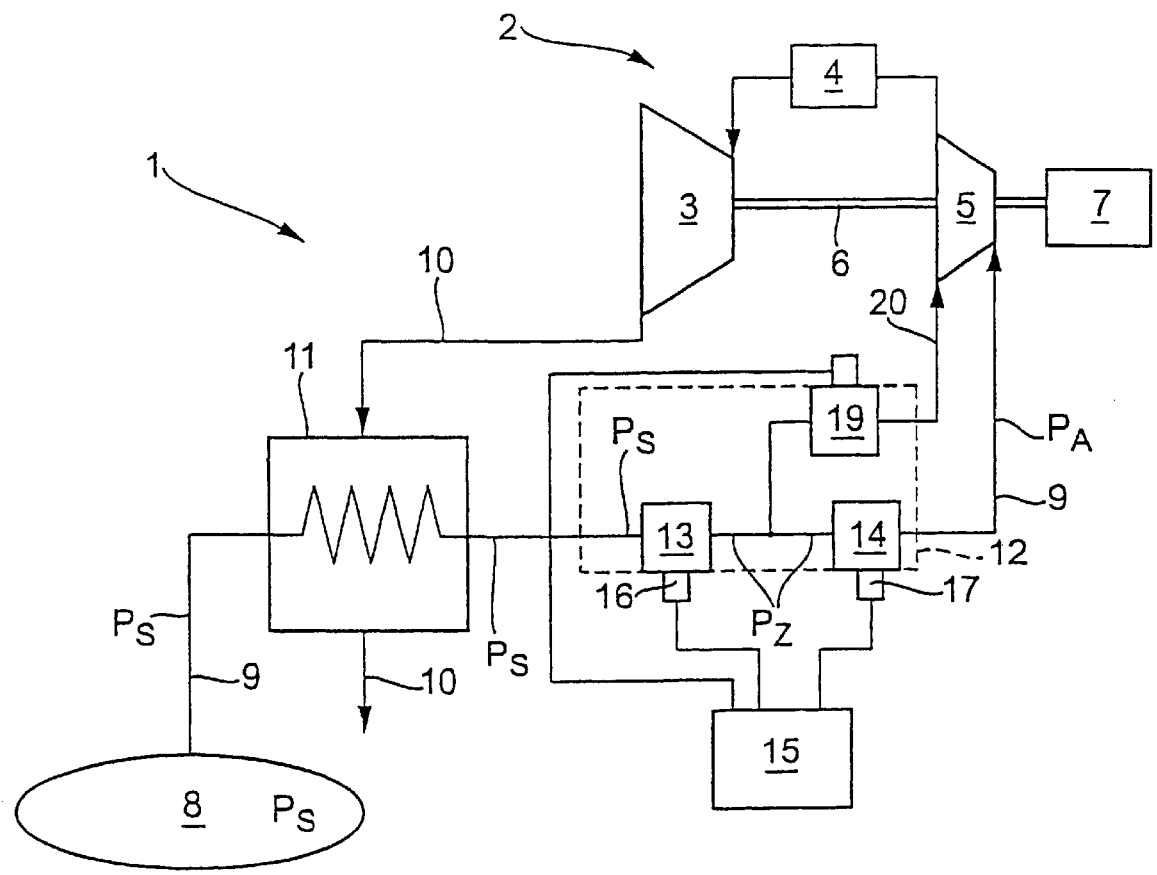
FIG. 1 shows a diagrammatic representation, like a circuit diagram, of a gas-storage power plant according to the invention.

According to FIG. 1, a gas-storage power plant 1 (only partly shown) according to the invention comprises at least one turbogroup 2, which in this case has a turbine 3, an associated burner 4 and an additional turbine 5. The turbines 3 and 5 are in drive connection with one another via a common shaft 6 and with a generator 7, which serves to generate electricity. In addition, the gas-storage power plant 1 has a gas reservoir 8, in which a working gas of the gas-storage power plant 1 can be stored under pressure. The working gas used is preferably air; however, it is obvious that, in principle, another gas may also serve as working gas. It is assumed below that the gas-storage power plant 1 is driven with air as working gas. Accordingly, the additional turbine 5, which is supplied with the gas or with the air via a gas-supply line 9, is designated below as air turbine 5, whereas the turbine 3 supplied with the hot combustion flue gases of the burner 4 is designated below as gas turbine 3.

Downstream of the gas turbine 3, the expanded flue gases are directed via a flue-gas line 10 through a recuperator 11 to a flue-gas system (not shown), which may comprise, in particular, a sound absorber and/or a flue-gas cleaning arrangement. In the recuperator 11, the flue-gas line 10 and the gas-supply line 9 are coupled to one another in a heat-transmitting manner, as a result of which the heat energy contained in the flue gas can be utilized for preheating the fresh gas fed to the air turbine 5.

It is obvious that such a gas-storage power plant 1 also has at least one compressor group (not shown here), by means of which the gas reservoir 8 can be refilled/filled or recharged/charged with working gas, that is preferably with air. The gas reservoir is charged with working gas to a maximum extent, for example during the weekend. During the first weekday, some of the working gas is discharged, after which, during the night, the reservoir is partly charged, possibly not quite to the maximum extent. This discharging and recharging process is repeated over the entire working week, the quantity of the charged working gas at the start of the workdays gradually sinking and reaching its low point at the end of the working week.

A valve arrangement 12, which is symbolized here by a frame shown by broken lines, is arranged in the gas-supply line 9 upstream of the air turbine 5 and in particular downstream of the recuperator 11. According to the invention, this valve arrangement 12 has at least two control valves, namely a first control valve 13 lying upstream and a second control valve 14 lying downstream. In principle, the valve arrangement 12 may contain further control valves; however, to simplify the illustration, the invention is explained with reference to an embodiment having only two control valves 13 and 14. In this case, the control valve 13 functions as an emergency-trip valve and as a control valve. The control valves 13 and 14 are connected to a control device 15 and can be actuated with the latter for closed-loop and/or open-loop control, in which case a closed position and a completely open position and also in principle any desired intermediate positions can be set in each case at the control valves 13 and 14.

To actuate the control valves 13 and 14, the control device 15 is connected to actuators 16 and 17 of the control valves 13 and 14, respectively. These actuators 16 and 17 may in each case be designed, for example, as a hydraulic drive with an electrohydraulic converter. Incoming electrical actuating signals are then converted into corresponding hydraulic flows which produce corresponding actuating movements at the throttling members or stop members of the control valves 13 and 14.

In the specific embodiment shown here, a bypass valve 19 is also arranged between the control valves 13 and 14, by means of which bypass valve 19, via a bypass line 20 between the control valves 13 and 14, gas is diverted from the gas-supply line 9 and can be directed, for example, to a further inlet of the air turbine 5.

Figure 2:
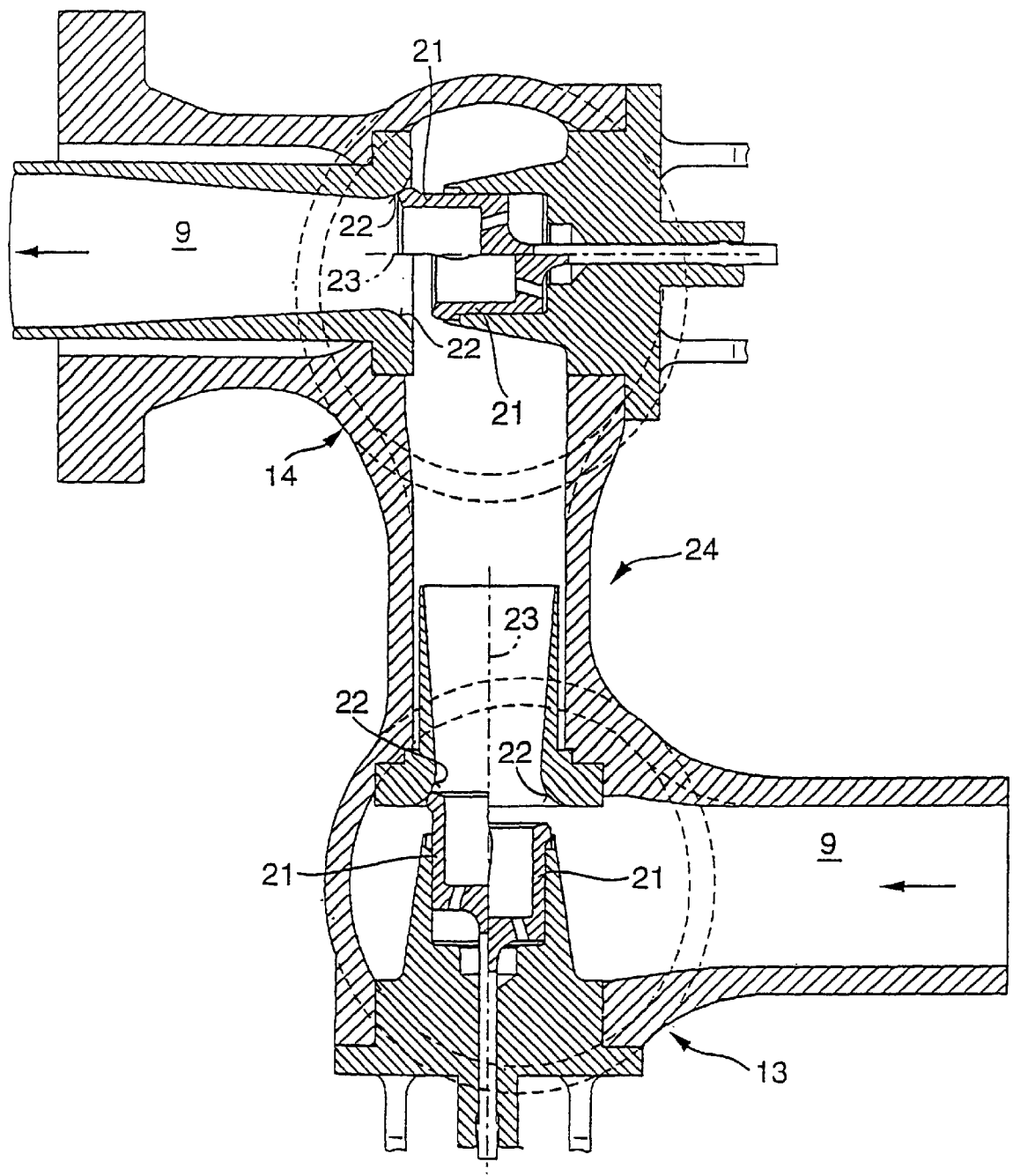
FIG. 2 shows a sectional view of a valve arrangement according to the invention.

According to FIG. 2, the two control valves 13 and 14 can be combined in a common housing to form a subassembly 24, which makes it simpler to fit them into the gas-supply lines 9. In addition, the bypass valve 19 (cf FIG. 1) can be integrated in this subassembly 24 between the control valves 13 and 14. As can be seen from FIG. 2, the two control valves 13 and 14 may expediently be of the same construction having identical or similar components. In this way, the multiplicity of parts can be reduced on the one hand and the component parts cost can be reduced on the other hand due to larger batch quantities. The two control valves 13 and 14 may differ from one another, for example, in their flow cross sections.

Here, both control valves 13 and 14 are configured as single-seat angle valves which are subjected to flow transversely to the valve lift, whereas the outflow direction is in the valve lift direction. In order to be able to realize this inflow and outflow with 90° deflection in both control valves 13 and 14, the two control valves 13 and 14 are arranged so as to be rotated by 90° relative to one another in the subassembly 14 shown here. Accordingly, each control valve 13, 14 contains a valve body 21, which interacts with a valve seat 22 in its closed position. In FIG. 2, for each valve body 21, with respect to a plane 23 of symmetry which is perpendicular to the drawing plane, the one valve-body half is shown in the closed position of the valve body 21 and the other valve-body half is shown in the maximum open position of the valve body 21.

In a preferred embodiment, the two control valves 13, 14 may be designed as pilot-controlled pre-lift valves or as relieved single-seat valves, of which the latter are shown in FIG. 2.

The present invention works as follows:

A storage pressure $P_S$ is applied on the inlet side of the first control valve 13. If pressure losses up to the first control valve 13 are ignored, this storage pressure $P_S$ corresponds to the pressure in the gas reservoir 8. The storage pressure $P_S$ applied at the inlet of the first control valve 13 at least correlates with the pressure prevailing in the gas reservoir 8. Accordingly, the storage pressure $P_S$ can vary with the loading state of the gas reservoir. The turbogroup 2 receives a working pressure $P_A$, which varies with the operating state of the turbogroup 2. By means of the valve arrangement 12, the storage pressure $P_S$ applied on the inlet side is now throttled to the current working pressure $P_A$. According to the invention, this is done in two stages, the invention comprising two different methods for the first stage. According to the first method, the first control valve 13 throttles the storage pressure $P_S$, for example the storage pressure $P_S$ according to the weekday pressure, to an intermediate pressure $P_Z$, this throttling being effected by open-loop control. To this end, the control valve 13, for example according to the weekday pressure, is set to a valve lift point. The resulting intermediate pressure is then variable according to the storage pressure. This intermediate pressure $P_Z$ is expediently always slightly higher than the maximum working pressure $P_A$ required by the turbogroup 2. According to the second method, the variable storage pressure $P_S$ is controlled to a constant intermediate pressure $P_Z$ in a closed-loop system by means of the control valve 13. The actuation of the first control valve 13 is realized, for example, by a feedback control circuit, the command variable of which is expediently formed by the intermediate pressure $P_Z$ to be kept constant. To this end, deviations are determined by a setpoint/actual-value comparison of the values of the intermediate pressure $P_Z$ and compensated for by suitable control commands. In both methods, the second control valve 14 now throttles this intermediate pressure $P_Z$ to the working pressure $P_A$, this throttling being effected only by closed-loop control. A feedback control circuit for the actuation of the second control valve 14 contains, as command variables, for example, the output of the turbomachine or the speed of the rotor of the machine. The working pressure $P_A$ is set in accordance with these command variables. This means that deviations which are determined by a setpoint/actual-value comparison of the values of the working pressure $P_A$ or of the command variables according to which the working pressure is set are compensated for by suitable control commands.

The valve arrangement 12 in the case of the invention therefore only needs two feedback control circuits of simple construction. The outlay for the closed-loop or open-loop control of the valve arrangement 12 is reduced by this construction. Furthermore, increased operating safety and reliability is obtained at the same time, which is due to the reduced stress on the valves. In addition, the result of the two-stage throttling is that the maximum pressure differences applied separately at the control valves 13 and 14 are markedly smaller than the pressure difference between storage pressure $P_S$ and working pressure $P_A$, a factor which reduces the stress on the control valves 13 and 14. In particular, vibrations, oscillation excitations and noise generation can be reduced or completely avoided.

List of Designations
1 gas-storage power plant
2 turbogroup
3 turbine/gas turbine
4 burner
5 additional turbine/air turbine
6 shaft
7 generator
8 gas reservoir 9 gas-supply line
10 flue-gas line
11 recuperator
12 control valve arrangement
13 first control valve
14 second control valve
15 control device
16 actuator of 13
17 actuator of 14
19 bypass valve
20 bypass line
21 valve body
22 valve seat
23 plane of symmetry of 21
24 subassembly
$P_Z$ storage pressure
$P_A$ working pressure
$P_Z$ intermediate pressure

What is claimed is:

1. A gas-storage power plant,
having a gas reservoir in which a gas can be stored under pressure,
having a turbogroup which has at least one turbine,
having a gas-supply line which leads from the gas reservoir to the turbogroup, and
having a valve arrangement which is arranged in the gas-supply line and throttles a storage pressure ($P_S$) applied on the inlet side to a working pressure ($P_A$), by closed-loop and/or open-loop control,
wherein
the valve arrangement has at least two control valves arranged in series,
having a leading first control valve for throttling the storage pressure ($P_S$) applied on the inlet side at the first control valve to an intermediate pressure ($P_Z$) and a further control valve for throttling a pressure applied on the inlet side at the further control valve to the working pressure ($P_A$).

2. The gas-storage power plant as claimed in claim 1, wherein the valve arrangement has two control valves arranged in series, and the pressure applied at the second control valve on the inlet side corresponds to the intermediate pressure ($P_Z$) at the outlet side of the first control valve.

3. The gas-storage power plant as claimed in claim 1, wherein the valve arrangement has actuators for driving the control valves, the actuators each being connected to a control device which is interconnected in a feedback control circuit or a plurality of feedback control circuits for the purpose of feeding values of the storage pressure ($P_S$), of the intermediate pressure ($P_Z$) and/or of operating variables of the turbogroup to the control device.

4. The gas-storage power plant as claimed in claim 1, wherein the first control valve and/or the further control valve is designed as a relieved single-seat valve.

5. The gas-storage power plant as claimed in claim 1, wherein the first control valve and/or the further control valve is designed as a pilot-controlled valve.

6. The gas-storage power plant as claimed in claim 1, wherein the valve arrangement has a bypass valve which is connected between the outlet of the first control valve and th turbogroup.

7. A method of operating a gas-storage power plant as claimed in claim 1, wherein the first control valve is controlled in a closed-loop system for generating an essentially constant intermediate pressure ($P_Z$).

8. The method as claimed in claim 7, wherein the first control valve is controlled in a closed-loop system as a function of a setpoint/actual-value deviation of a predetermined intermediate pressure ($P_Z$).

9. A method of operating a gas-storage power plant as claimed in claim 1, wherein the first control valve is controlled in an open-loop system according to a predetermined valve-lift position, as a result of which a variable intermediate pressure ($P_Z$) is generated.

10. The method as claimed in claim 8, wherein the second control valve is controlled in a closed-loop system by means of values of the output of the turbogroup and/or of the speed of the rotor of the turbogroup as command variables of a feedback control circuit, and the working pressure ($P_A$) is set in accordance with these command variables.

11. The method as claimed in claim 10, wherein the second control valve is controlled in a closed-loop system as a function of a setpointlactual-value deviation of the currently required command variable or command variables.

12. The method as claimed in claim 7, wherein the predetermined intermediate pressure ($P_Z$) or the intermediate pressure ($P_Z$) which occurs is greater than or equal to the maximum working pressure ($P_A$) which occurs.

* * * * *